United States Patent
Ogawa et al.

[11] Patent Number: 5,857,044
[45] Date of Patent: Jan. 5, 1999

[54] METHOD AND APPARATUS FOR PROCESSING TIME CODE

[75] Inventors: Tetsuo Ogawa; Hiroshi Kiriyama; Tomokiyo Kato; Hiroaki Kikuchi, all of Kanagawa, Japan; Luke Freeman, Redwood City, Calif.

[73] Assignees: Sony Corporation, Tokyo, Japan; Sony Electronics, Inc., Park Ridge, N.J.

[21] Appl. No.: 700,341

[22] Filed: Sep. 23, 1996

[51] Int. Cl.$^6$ ........................................... H04N 5/93
[52] U.S. Cl. ........................ 386/62; 386/66; 386/65
[58] Field of Search ............................. 386/52, 55, 60, 386/62, 65, 131, 66; 348/441, 443; H04N 5/76

[56] References Cited

U.S. PATENT DOCUMENTS

| | | | |
|---|---|---|---|
| 4,175,267 | 11/1979 | Tachi ................................. | 386/65 |
| 4,837,638 | 6/1989 | Fullwod ............................ | 386/65 |
| 5,146,448 | 9/1992 | Adachi et al. .................... | 386/65 |
| 5,337,296 | 8/1994 | Okubo ............................... | 386/65 |

FOREIGN PATENT DOCUMENTS

0176324A1  2/1986  European Pat. Off. ......... H04N 5/76

Primary Examiner—Thai Tran
Assistant Examiner—Luong Nguyen
Attorney, Agent, or Firm—Peter C. Toto, Esq.; Jerry A. Miller

[57] ABSTRACT

In a method for processing a time code such that time code data composed of a hour minute second frame accompanying picture information of a predetermined system is mapped onto picture information of another system, when converting the picture information of the predetermined system into that of another system, mapping the time code when converting the system of the picture information including the steps of converting time code data accompanying picture information of said predetermined system into a total frame number x, calculating a total frame number y of the converted time code data for said time code data from said total frame number x and generating the converted time code from the total frame number y.

4 Claims, 15 Drawing Sheets

FIG. 3

METHOD AND APPARATUS FOR PROCESSING TIME CODE

BACKGROUND OF THE INVENTION

1. Field of the Invention

The present invention relates to a method and an apparatus for processing a time code. The method and apparatus are arranged to map the time code used for an operation such as editing when converting picture information of a predetermined system into that of another system.

2. Description of the Related Art

Today, there are two known standard TV signal systems, NTSC (National Television System Committee) system having 525 scan lines/field frequency of 59.94 Hz (simply called 525/59.94) and PAL (Phase Alternating by Line) system having 625 scan lines/field frequency of 50 Hz (simply called 625/50). In order to exchange a TV program among countries, it is often necessary to convert a signal from one system to the other.

For example, in order for the USA or Japan to broadcast a TV program produced for Europe, it is necessary to convert a PAL system video signal, recorded with 625/50, into an NTSC system video signal of 525/59.94.

Conventionally, when editing the video signal of the NTSC system program converted from the PAL system program, a user has to manually edit the video signal as he or she is watching the picture on a monitor. Because the time code added to the PAL system video signal (source side) is not mapped to the NTSC system video signal (target side), such editing takes substantial time and lowers editing accuracy.

SUMMARY OF THE INVENTION

It is an object of the present invention to provide a method and an apparatus for processing a time code and in particular arranged to map the time code in a one-to-one manner when converting the system of the picture information.

According to an aspect of the invention, a method for processing a time code is arranged to map a time code composed of a hour-minute-second frame accompanying the picture information of a predetermined system onto the picture information of another system. As such, the time code similarly accompanies the picture information when converting the picture information of the predetermined system into the picture information of another system. Hence, the method for processing a time code includes the steps of converting time code data accompanying the picture information of the predetermined system into a total frame number x, calculating a total frame number y of the converted time code data for the total frame number x, and generating the converted time code data from the total frame number y.

In the case where picture information having a predetermined frame frequency a is converted into picture information having a different frame frequency b (the picture information of the predetermined frequency a being obtained by changing the reproducing speed by n % of the picture information of the predetermined system rather than the recording speed) the process of calculating the total frame number is executed to define the relationship between the total frame number x of the time code data added to the picture information of the predetermined frame frequency a at each frame and the total frame number y of the time code data added to the picture information of the frame frequency b at each frame as follows:

$$y/b = x/(a/(1+n/100))$$

assuming that;

$$0 \leq x \leq (24*60*60*a)-1)*(1+n/100)$$

$$0 \leq y \leq ((24*60*60*b)-1)$$

According to another aspect of the invention, the apparatus for processing a time code is used to map a time code composed of a hour-minute-second frame accompanying the picture information of a predetermined system onto the picture information of another system so that the time code accompanies the picture information of the other system when converting the picture information of the predetermined system into that of another system. For this purpose, the apparatus includes means for converting time code data accompanying the picture information of the predetermined system into a total frame number x, means for calculating a total frame number y of converted time code data for the total frame number x, and means for generating the converted time code data from the total frame number y.

In order to convert picture information of a predetermined frame frequency a, (the frequency a being obtained by changing by n % the reproducing speed of the picture information of the predetermined system rather than the recording speed) into picture information of another frame frequency b, means for calculating the total frame number is employed to define a relationship between the total frame number x of time code data added to the picture information of the predetermined frame frequency a at each frame and a total frame y of time code data added to the picture information of the frame frequency b as follows:

$$y/b = x/(a/(1+n/100))$$

assuming that;

$$0 \leq x \leq ((24*60*60*a)-1)*(1-n/100)$$

$$0 \leq y \leq ((24*60*60*b)-1)$$

As noted above, frequency a is obtained by changing the reproducing speed by n % of the picture information of the predetermined system rather than the recording speed.

In operation, the method for processing the time code includes the steps of converting the time code data accompanying the picture information of a predetermined system into a total frame number x, calculating a total frame number y of the converted time code data for the total frame number x, and generating the converted time code data from the total frame number y. Hence, when converting picture information of a predetermined system into the picture information of another system, the time code composed of a hour-minute-second frame accompanying picture information of the predetermined system is mapped onto the picture information of the other system in a one-to-one manner.

The apparatus for processing a time code includes means for converting the time code data accompanying the picture information of the predetermined system into a total frame number x, means for calculating a total frame number y of the converted time code data for the total frame number x, and means for generating the converted time code data from the total frame number y. Hence, when converting the picture information of the predetermined system into the picture information of another system, the time code composed of a hour-minute-second frame accompanying the picture information of the predetermined system is mapped onto the picture information of another system in a one-to-one manner.

BRIEF DESCRIPTION OF THE DRAWINGS

FIG. 3 is a format view showing LTC treated in the adapter of FIG. 2;

DESCRIPTION OF THE PREFERRED EMBODIMENTS

Figure 1:
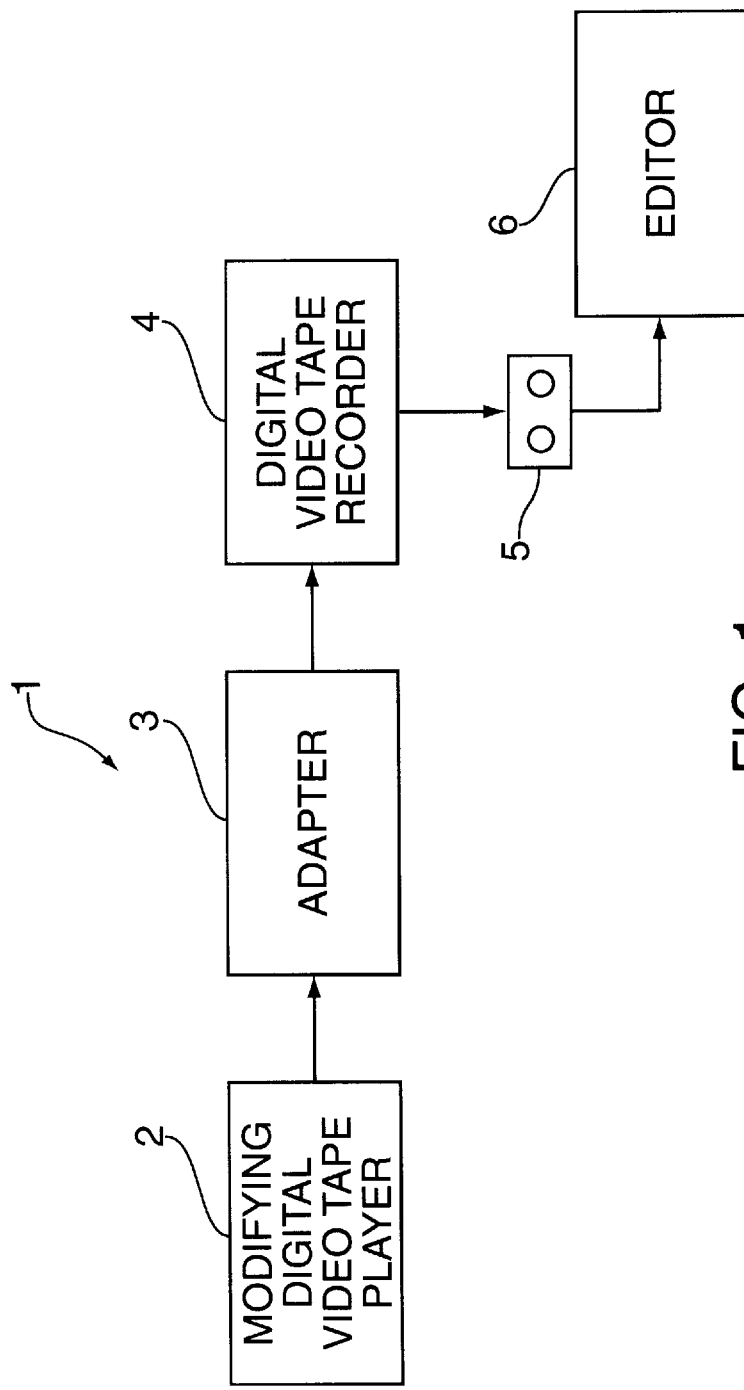
FIG. 1 is a block diagram showing an embodiment of a system for editing picture information and for processing a time code according to the present invention.

The following description will be directed to a method and an apparatus for processing a time code according to an embodiment of the present invention that consists of a system 1 for editing picture information as shown in FIG. 1. The system 1 operates to edit picture information with a time code obtained by the method and the apparatus for processing a time code.

The picture information editing system 1 includes; a modifying digital video tape player 2 that reproduces a video tape on which is recorded a PAL (Phase Alternating by Line) system video signal having 625 scan lines/field frequency of 50 Hz, an adapter 3 for converting the video signal reproduced by the modifying digital video tape player 2 into a video signal of 525/59.94 and for mapping a time code, a digital video tape recorder 4 for recording an NTSC system video signal of 525/59.94 and a converted time code for each frame on a video tape cassette 5, and an editor 6 for editing the video signal of 525/59.94 with the time code of each frame recorded on the video tape cassette 5 by the digital video tape recorder 4.

The modifying digital video tape player 2 may, for example, be a video tape recorder of a D-1 format (called a D-1 video tape recorder). In this case, the D-1 video tape recorder is required to vary its reproducing speed, the detail of which will be described below.

The arrangement of the adapter 3 will be described with reference to FIG. 2. The adapter 3 includes; a VITC reader 7 for reading a vertical interval time code (called VITC) from a video signal produced by the modifying digital video tape player 2, a system converter 8 for converting the scan line number and the field frequency into those of the NTSC system, that is, 525 scan lines and a field frequency of 59.94, a time code reader 9 for reading an LTC (Longitudinal Time Code), a CPU 10 for generating the converted time code data of the NTSC system video signal based on the time code data read from the time code reader 9, a time code generator 11 for generating the converted time code from the converted time code data sent from the CPU 10, and a control interface 12 for supplying the reproducing speed information n % from the modifying digital video tape recorder 2.

In editing the picture information, it is essential to know the location of the video tape. For this purpose, the time code is used. The time code includes the LTC recorded lengthwise on the video tape and the VITC to be inserted into the vertical interval time.

Figure 3:
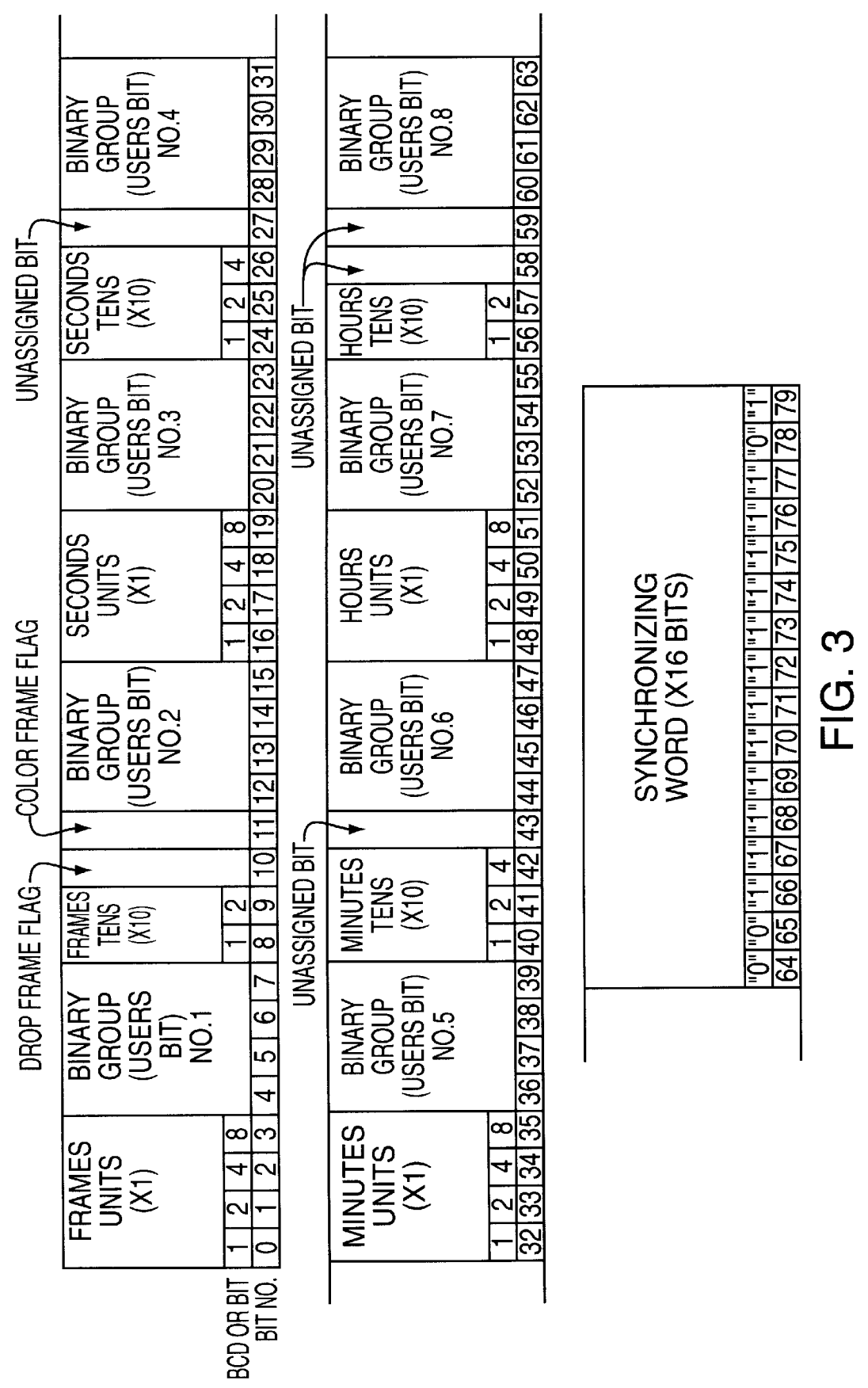

As shown in FIG. 3, the LTC has a total of 80 bits (00 to 79) having time information and user's bits of 64 bits and synchronous word bits of 16 bits within one frame. The time information is a 24-hour system code format in which a time column is 00 to 23 hours, a minute column is 00 to 59 minutes, and a second column is 00 to 59 seconds. For the PAL system video signal, the frame values are numbered from 00 frames to 24 frames, a total of 25. For the NTSC system video signal, the frame values are numbered from 00 to 29 frames, totaling 30. The modifying system employs a self-clock type width modulation called a biphase mark, in which at each bit period, a clock inversion (transition) takes place at a start point, when a bit value is "1", a transition takes place in the center of the period, and when a bit value is "0", no transition takes place in the center of the period.

Figure 4:
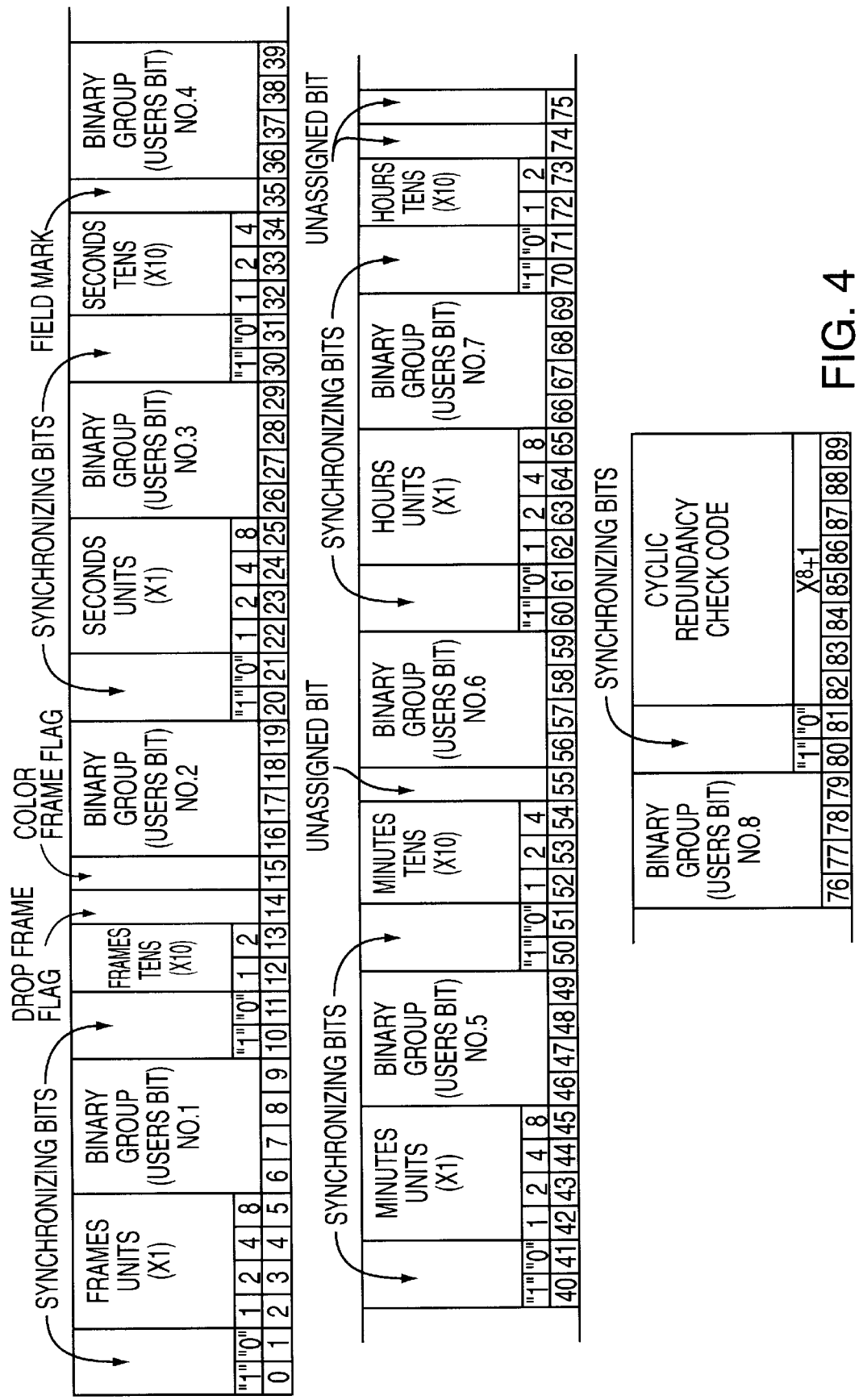
FIG. 4 is a format view showing VITC treated in the adapter of FIG. 2.

As shown in FIG. 4, the VITC has a total of 90 bits containing the LTC of 64 bits, 4 synchronous bits added to each group of 8 bits of the LTC, and a CRC code of 8 bits. In the modifying system, a transition takes place only when a change of a value between the adjacent bit cells takes place, such as from "1" to "0" or "0" to "1". The signal format is binary. No transition takes place if the adjacent values are equal.

The LTC covers the range of reading speed from ¼ to 50. The VITC covers the range of reading speed from ½ to stop. In order to enhance the editing efficiency, the automatic switching of both the LTC and the VITC is made possible when reading the signal.

Figure 2:
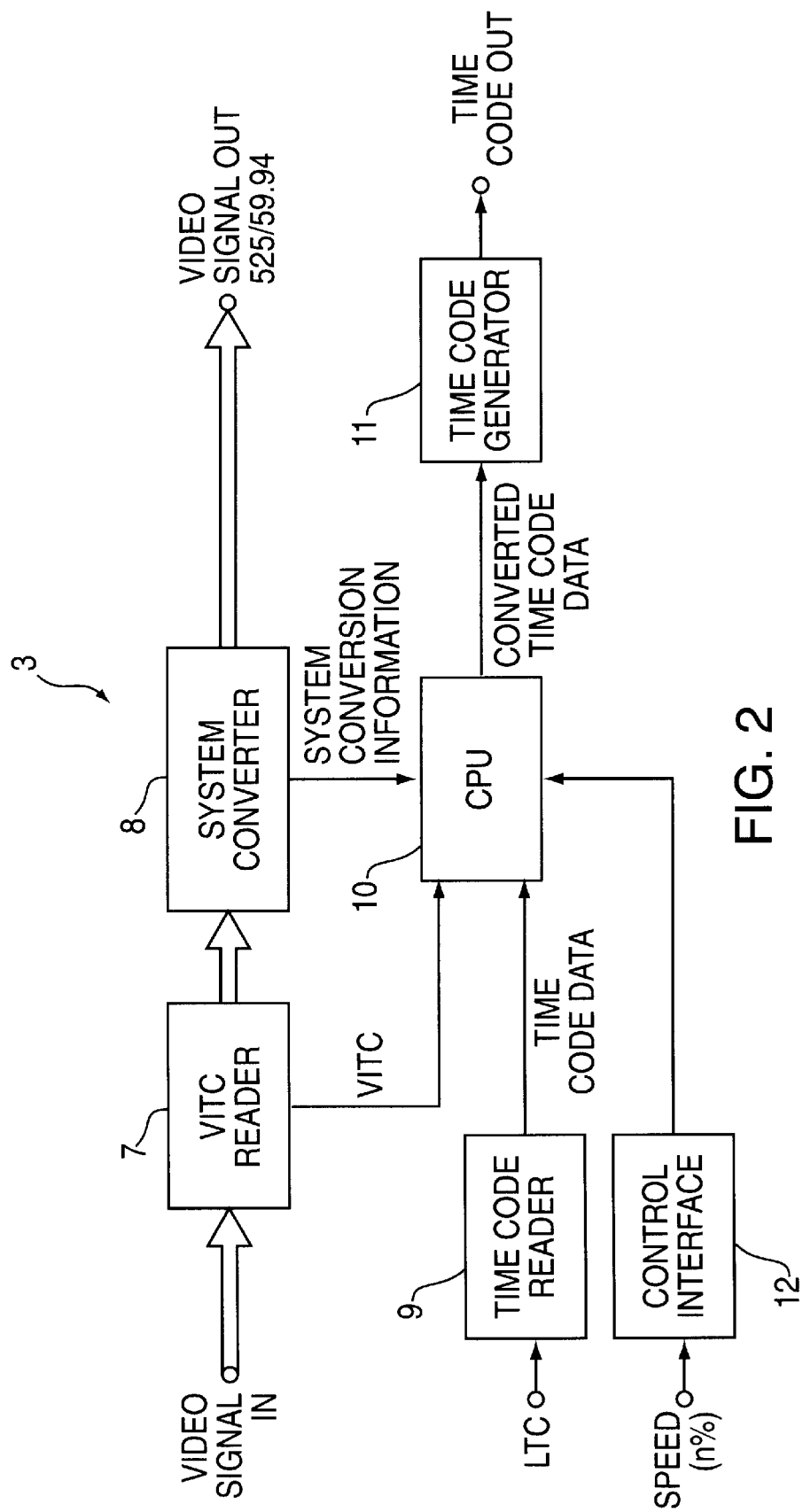
FIG. 2 is a block diagram of an adapter used for the system for editing picture information of FIG. 1.

The LTC added to the PAL system video signal output from the modifying digital video tape player 2 (FIG. 1) is supplied to the time code reader 9 (FIG. 2). The time code reader 9 operates to extract a clock signal from the LTC, decode the LTC with the extracted clock signal, and output the time code data and binary bits.

Figure 5:
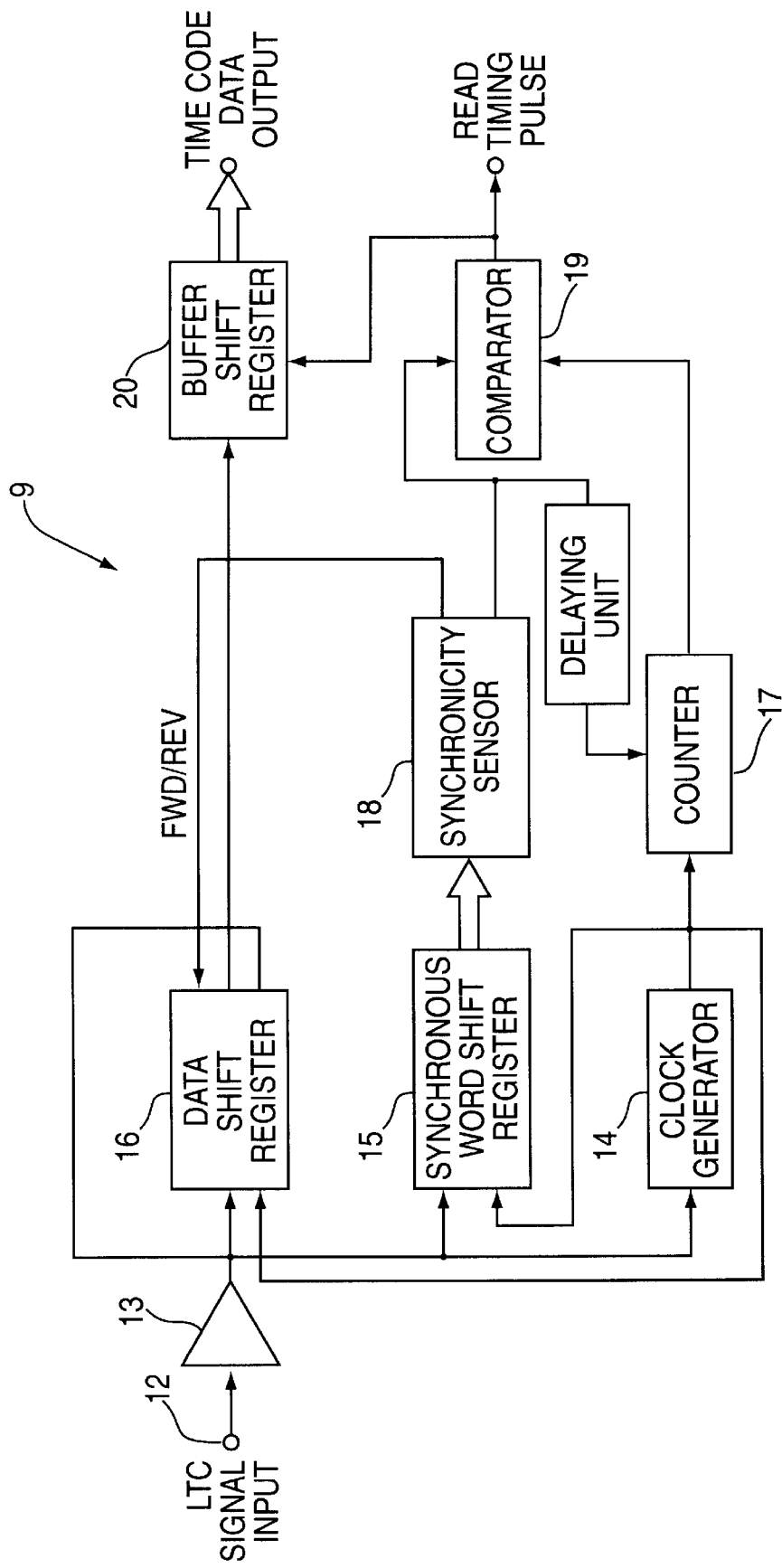
FIG. 5 is a block diagram showing a time code reader that is a component of the adapter of FIG. 2.

The circuit diagram of the time code reader 9 is shown in FIG. 5. The LTC, provided as a biphase mark signal, is supplied from an input terminal 12, through a buffer 13, to a clock generator 14, a synchronous word shift register 15 and a data shift register 16. The clock generator 14 operates to extract a clock signal from the biphase mark signal and supply the clock signal to the synchronous word shift register 15, the data shift register 16 and the counter 17.

The synchronous word shift register 15 operates to read the biphase mark signal on the input timing of the clock signal from the clock generator 14. Synchronicity sensor 18 operates to sense synchronous word bits containing the synchronous portion of 12 consecutive "1's" (for example). The synchronicity sensor 18 operates to sense if two bits following the sensed synchronous portion are either "00" or "01" and then supply a reading direction signal of FWD/REV to the data shift register 16.

The data shift register 16 operates to read the biphase mark signal according to the reading direction signal from the synchronicity sensor 18.

The counter 17 operates to measure 80 clock pulses generated by the clock generator 14. When the counter 17 measures 80 clock pulses, a comparator 19 compares the timing of the pulses with the synchronous signal. If the data group is determined to be correct, the comparator 19 outputs a timing pulse for reading data. Either 64- or 32-bit time code data is output from buffer shift register 20.

The time code data is supplied from the time code reader 9 to the CPU 10 (FIG. 2). The CPU 10 also receives system conversion information sent from the system converter 8. Then, the CPU 10 operates to generate the converted time code data of the NTSC system video signal according to the system conversion information.

Figure 6:
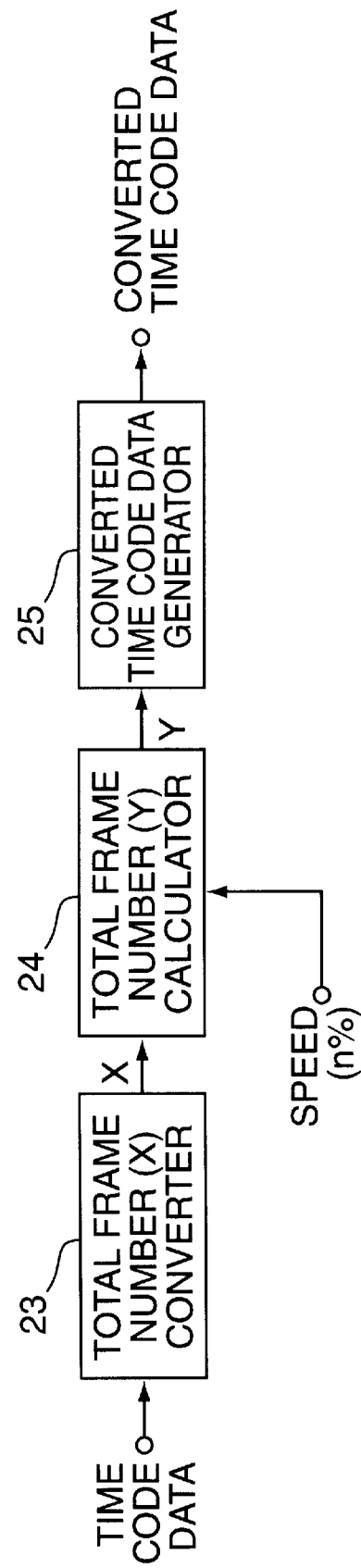
FIG. 6 is a block diagram showing a CPU that is a component of the adapter of FIG. 2.

The circuit diagram of the CPU 10 is shown in FIG. 6. The CPU 10 includes: a total frame number converter 23 for converting the time code data from the time code reader 9 (FIG. 2) into a total frame number x; a total frame number calculator 24 for calculating a total frame number y of the converted time code data for the time code data from the total frame number x; and a converted time code data generator 25 for generating the converted time code data from the total frame number y.

The frame number converter 23 operates to convert time code data AhBmCsDf composed of a hour(h)-minute(m)-second(s)frame(f) read by the time code reader 9 (FIG. 2) into a total frame number x derived by the expression of (60(60A+B)+C)*25+D. The total number calculator 24 operates to calculate the total frame number y from the total frame number x based on the relation expression of y/30= x/(25/(1+n/100)), where n is a value indicating how much the reproducing speed of the modifying digital video tape player 2 (FIG. 1) is changed as compared with the recording speed and is derived as reproducing speed information through the control interface 12 (FIG. 2). For example, if the modifying digital video tape player 2 has the same reproducing speed as the recording speed, n is made to be 0(%).

The converted time code data generator 25 (FIG. 6) operates to generate the converted time code data composed of the hour-minute-second frame from the total frame number y. That is, when converting the picture information on the source side having a predetermined frame frequency (25) into the picture information on the target side having another frame frequency (30), the CPU operates to establish the relation of y/30=x/(25/(1+n/100)) between the total frame number x of the time code added to the picture information on the source side at each frame and the total frame number y of the time code added to the picture information on the source side at each frame, where x and y are defined as;

$$0 \leq x \leq ((24*60*60*a)-1)*(1+n/100)$$

$$0 \leq y \leq ((24*60*60*b)-1)$$

Figure 7:
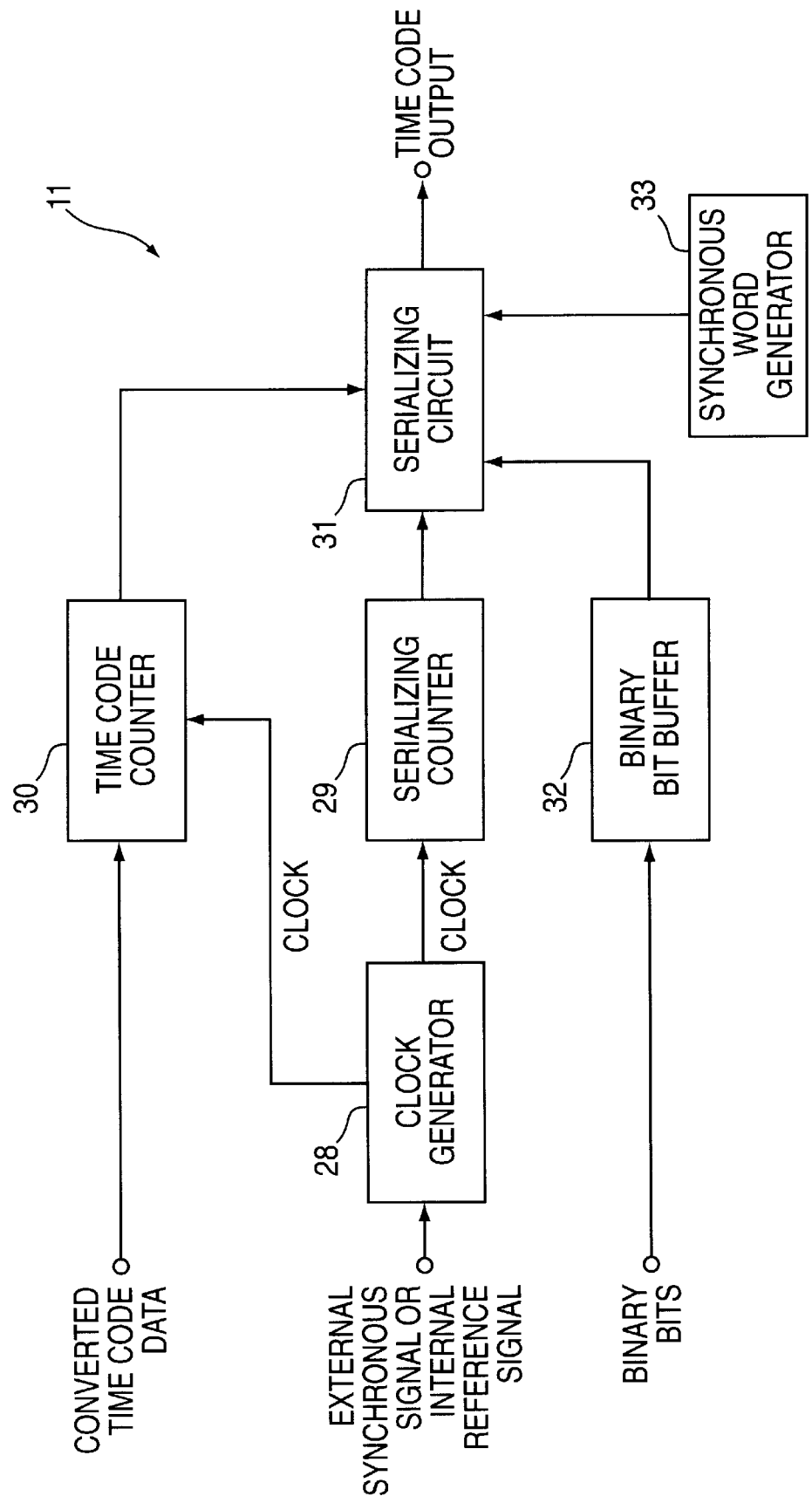
FIG. 7 is a block diagram showing a time code generator that is a component of the adapter of FIG. 2.

The CPU 10 then operates to supply the converted time code data to a time code generator 11 (FIG. 2). The time code generator 11 operates to generate the converted time code of the NTSC system video signal based on the converted time code data. The circuit diagram of the time code generator 11 will be shown in FIG. 7. A clock generator 28 generates a clock pulse from an external synchronous or an internal reference signal. The clock pulse is supplied to a serializing counter 29 and a time code counter 30. The time code counter 30 receives the converted time code data from the CPU 10 as well.

The time code counter 30 determines a new location of the converted time code for the NTSC system. The time code for the NTSC system is supplied to the serializing circuit 31. The serializing circuit 31 operates to serialize the time code, binary bits sent from a binary bit buffer 32, and a synchronous signal sent from a synchronous word generator 33, and then output the converted time code. This serialization is controlled by serializing counter 29.

Figure 8:
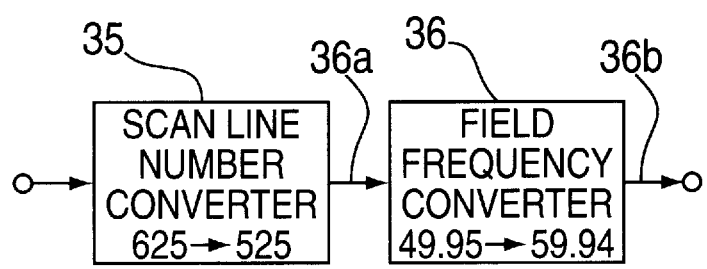
FIG. 8 is a block diagram showing an arrangement of a system converter that is a component of the adapter of FIG. 2.

In the operation mentioned above, the converted time code is supplied from the adapter 3 to the digital video tape recorder 4 (FIG. 1). The adapter 3 also operates to supply to the digital video tape recorder 4 the NTSC system video signal converted by the system converter 8. The arrangement of the system converter 8 is shown in FIG. 8. This description will be made for the case where a 0% reproduction is executed by the modifying digital video tape player 2, in which the reproducing speed information n is made almost zero. Actually, the 0% reproduction is 0.01% reproduction with 625/49.95.

The system converter 8, as shown in FIG. 8, includes a scan line number converter 35 for converting the scan line number of the video signal of 625 into 525 and a field frequency converter 36 for converting a field of 49.95 frequency into 59.94 Hz.

The scan line converter 35 interpolates 625 scan lines into 525 lines. This scan line number converter 35 performs a vertical filtering operation on 625 scan lines from 576 active lines to 486 active lines to produce the resulting 525 scan lines. The vertical resolution in the case of 625 scan lines is higher than that given in the case of 525 scan lines. As such, during the re-sampling process there is no loss of vertical resolution. As a result, the picture quality is high.

The field frequency converter 36 operates to convert the field frequency of 49.95 Hz to 59.94 Hz by making the field frequency ⅚ time. For this conversion, a so-called 3:2:3:2:2 pull-down process is used.

The 3:2:3:2:2 pull-down process will be described with reference to FIG. 9. The video signal of the field frequency of 49.95 Hz is interlaced so that an even field on an input side 36a is converted into an even field on an output side 36b and an odd field on the input side 36a is converted into an odd field on the output side 36b. No time lag takes place within the same frame of the video signal on the input side 36a. Hence, there are no timing problems when the video signal is converted to the signal on the output side 36b. Five frames on the input side are converted into one frame on the output side. Since no timing problems take place in the field sequence inside of the frame, a watcher sees a clear and stable picture.

The picture motion information at the field unit performed by the field frequency converter 36 is supplied as system conversion information to the CPU 10. This information is used by the CPU 10 for generating the converted time code data.

Figure 9:
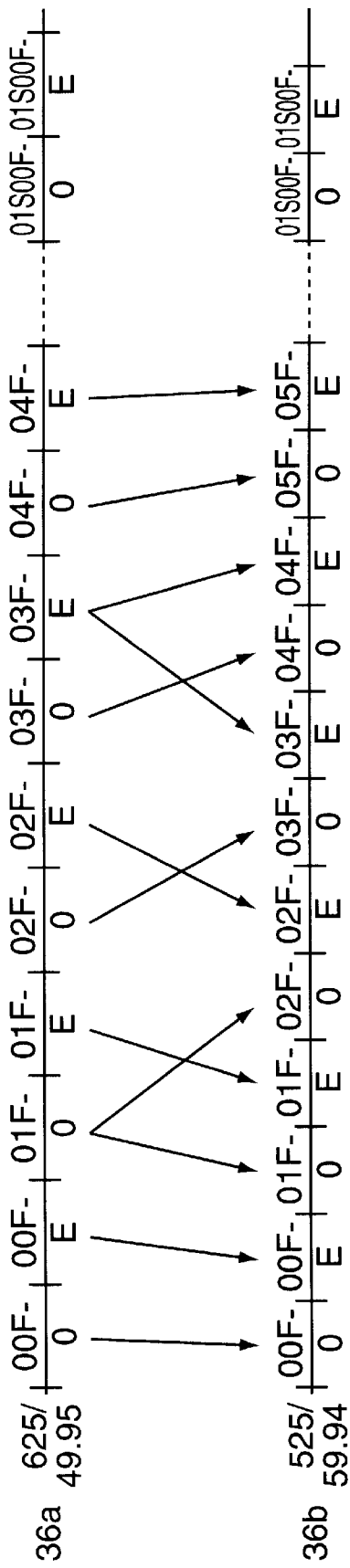
FIG. 9 is an explanatory view showing the operation of a field frequency converter that is a component of the system converter of FIG. 8.

The converted time code is a repetition of a loop completed at least within the period shown in FIG. 9. In this case, the mapping onto five frames of 625/49.95 and six frames of 525/59.94 makes it possible to constantly and uniquely define the converted time code on the target side against the time code on the source side. This means that the time codes are the same on the source side.

Next, the description will be directed to the −4% reproduction rate of the modifying digital video tape player 2 (FIG. 1) if the reproducing speed information n is −4. The −4% reproduction means that the video signal recorded at a rate of 25 frames per second is reproduced at a rate of 24 frames per second. That is, the video signal recorded with 625/50 is reproduced with 625/48 (actually, 47.95).

Figure 10:
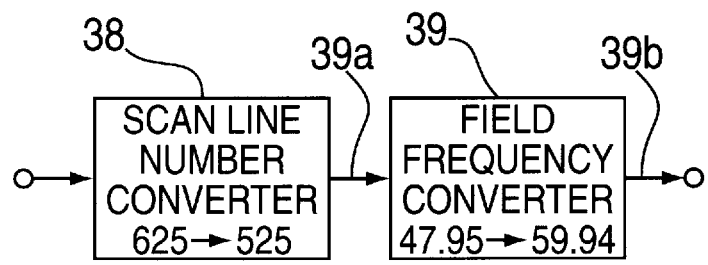
FIG. 10 is a block diagram showing an alternative arrangement of the system converter that is a component of the adapter of FIG. 2.

In this case, as shown in FIG. 10, the system converter 8 includes a scan line converter 38 for converting the scan line number of the video signal from 625 into 525 scan lines and a field frequency converter 39 for converting the field frequency from 47.95 Hz into 59.94 Hz.

The scan line converter 38 operates to interpolate 625 scan lines into 525. The scan line converter 38 performs a vertical filtering operation about 625 scan lines from 576 active lines to 486 active lines to produce 525 scan lines. The vertical resolution given in the case of 625 scan lines is higher than that given in the case of 525 scan lines. Therefore, in the re-sampling process, there is no loss of vertical resolution. As a result, the resulting picture quality is excellent.

The field frequency converter 39 performs the so-called 3:2 pull-down process for converting the field frequency of 47.95 Hz into 59.94 Hz by increasing the field frequency by 5/4 times.

Figure 11:
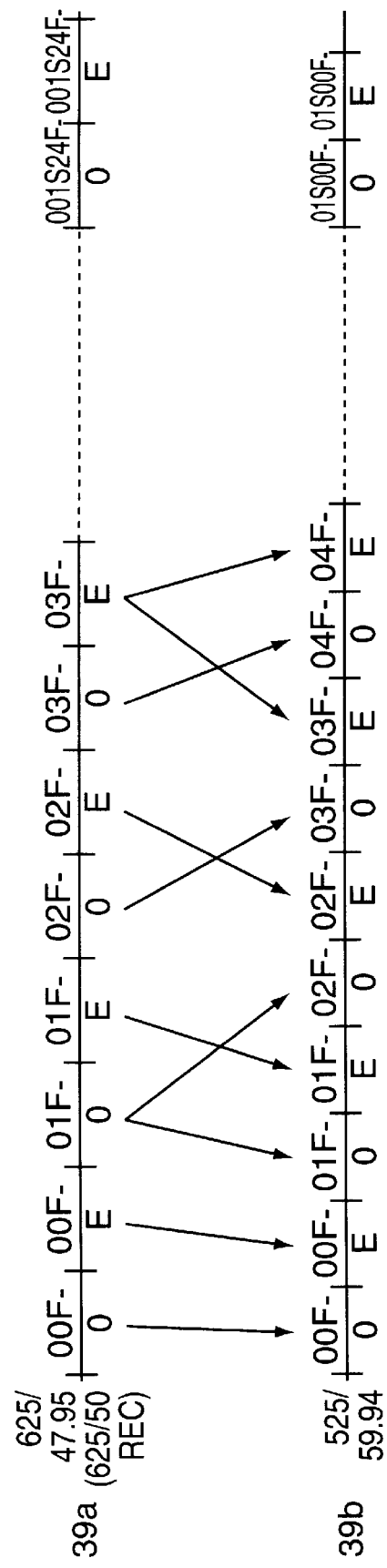
FIG. 11 is an explanatory view showing the operation of a field frequency converter that is a component of the system converter of FIG. 10.

The so-called 3:2 pull-down process will be described with reference to FIG. 11. The video signal of the field frequency of 47.95 Hz is interlaced so that an even field on the input side 39a is converted into an even field on the output side 39b and an odd field on the input side 39a is converted into an odd field on the output side 39b. No time lag takes place within the same frame of the video signal on the input side 39a. Therefore, no timing problems exist when the video signal is converted to the signal on the output side 39b. Four frames on the input side are converted into a new frame on the output side. Since no timing problems take place in the field sequence inside of the frame, a watcher sees a clear and steady picture.

The information about the motion of the picture at the field unit derived from the field frequency converter 39, which is the information about the system conversion, is supplied to the CPU 10. The information is used by the CPU 10 for generating the converted time code data.

In this case, a loop that makes the heads of the frames coincide with one another is repeated for four frames of the video signal of 625/47.95 and five frames of the video signal of 525/59.94. If the normal advancing rules are kept, the converted time code is slipped one frame per second.

Hence, n =−4 is substituted in the foregoing operation expression performed by the total frame number calculator 24 contained in the CPU 10. A value of y is calculated from the expression of $y/30=x/(25/(1+((-4)/100))$. Then, with the value of y, the converted time code data is calculated by the converted time code data converter 25 (FIG. 6). That is, the absolute mapping executed under the control of the CPU 10 allows the time code to be uniquely defined if the modifying digital video tape player 2 reproduces the video signal at n % variable rate.

The converted time code and the converted video signal generated by the adapter 3 are supplied to the digital video tape recorder 4. Then, the time code and the video signal are recorded on the video tape cassette 5 and then used by the editor 6 (FIG. 1).

Figure 12:
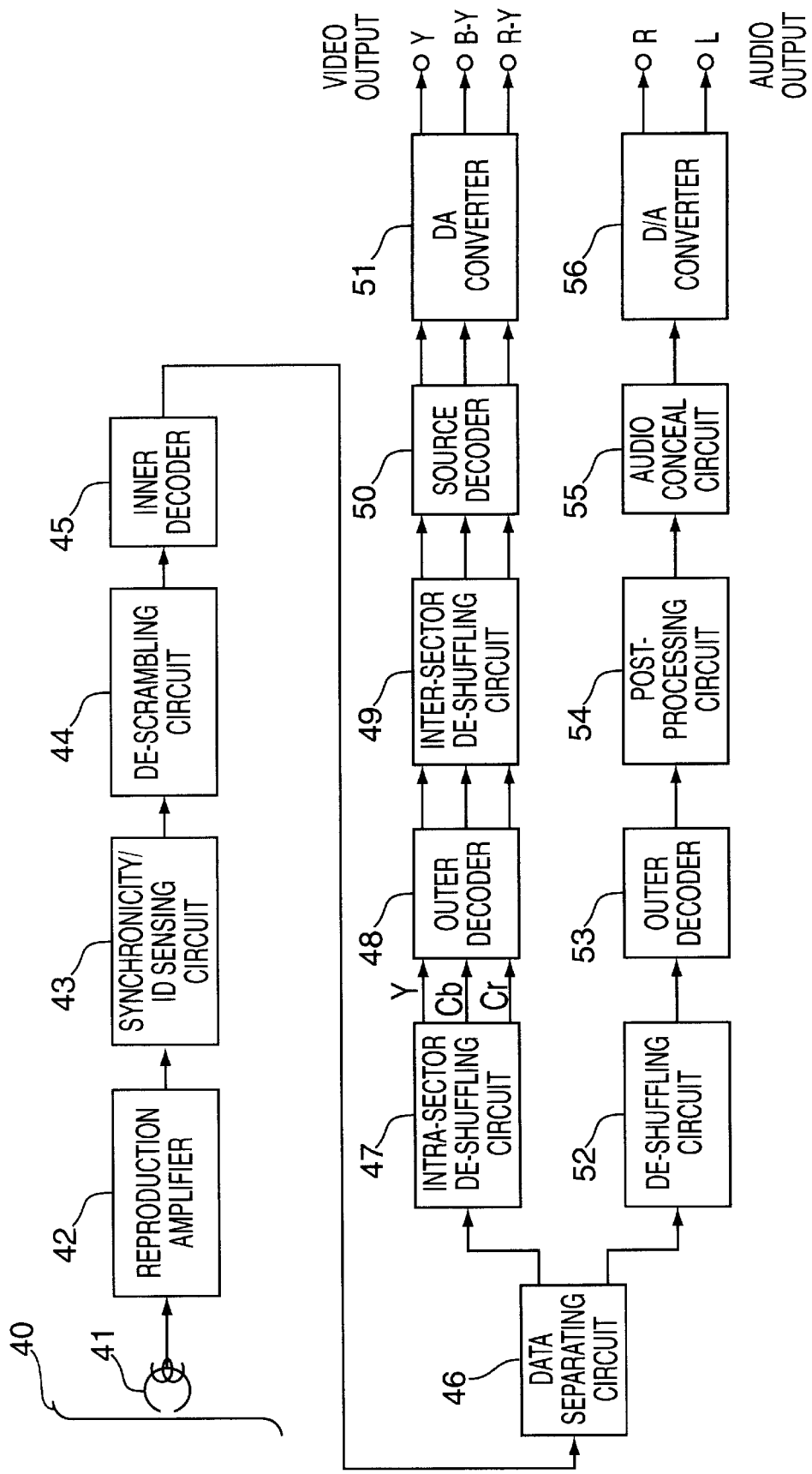
FIG. 12 is a block diagram showing a video and an audio processing system of a D-1 video player suitable for use as the modifying digital video tape player of FIG. 1.

As mentioned above, the modifying digital video tape player 2 used in the picture information editing system 1 may, for example, be a video tape recorder of a D-1 format. The D-1 video tape player is a standard video tape player based on the so-called 4:2:2 component coding system for CCIR. Rec. 601. The schematic arrangement of the video and the audio processing system of the D-1 video tape player will be shown in FIG. 12.

The digital signal recorded on a magnetic tape 40 of the video tape cassette is reproduced by the reproducing head 41 and then is amplified by a reproduction amplifier 42. The reproduction amplifier 42 operates to supply the reproduced output to a synchronicity/ID sensor 43. The synchronicity/ID sensor 43 operates to sense a synchronous signal and an ID from the reproduced output for clarifying the delimit of the signal and block number. De-scrambling circuit 44 operates to de-scramble the reproduced output and supply the de-scrambled output to an inner decoder 45. The inner decoder 45 performs an error correction with the inner codes added to the reproduced signal and supplies the corrected output to a data separating circuit 46. The data separating circuit 46 operates to separate the corrected output into a digital video signal and a digital audio signal. The digital video signal is supplied to an intra-sector de-shuffling circuit 47. The digital audio signal is supplied to a de-shuffling circuit 52.

The intra-sector de-shuffling circuit 47 operates to de-shuffle the digital video signal over sectors and then supply digital component video signals Y, Cb and Cr to an outer decoder 48. The outer decoder 48 performs an error correcting operation about those digital video signals Y, Cb and Cr with the outer codes. The corrected signals Y, Cb and Cr are supplied to a D/A converter 51 via an inter-sector de-shuffling circuit 49 and a source decoder 50. The D/A converter 51 converts the digital video signals Y, Cb and Cr, into analog component video signals Y, B-Y and R-Y and then outputs the analog signals.

As for the audio signal, numeral 52 denotes a de-shuffling circuit, which operates to de-shuffle a digital audio signal separated by the data separating circuit 46. The de-shuffled digital audio signal is error-corrected by an outer decoder 53. Then, the corrected signal is supplied to a D/A converter 56 through a post-processing circuit 54 and an audio conceal circuit 55. The D/A converter 56 converts the digital audio signals into analog audio signals and then outputs them as R- and L-channel audio signals.

Figure 13:
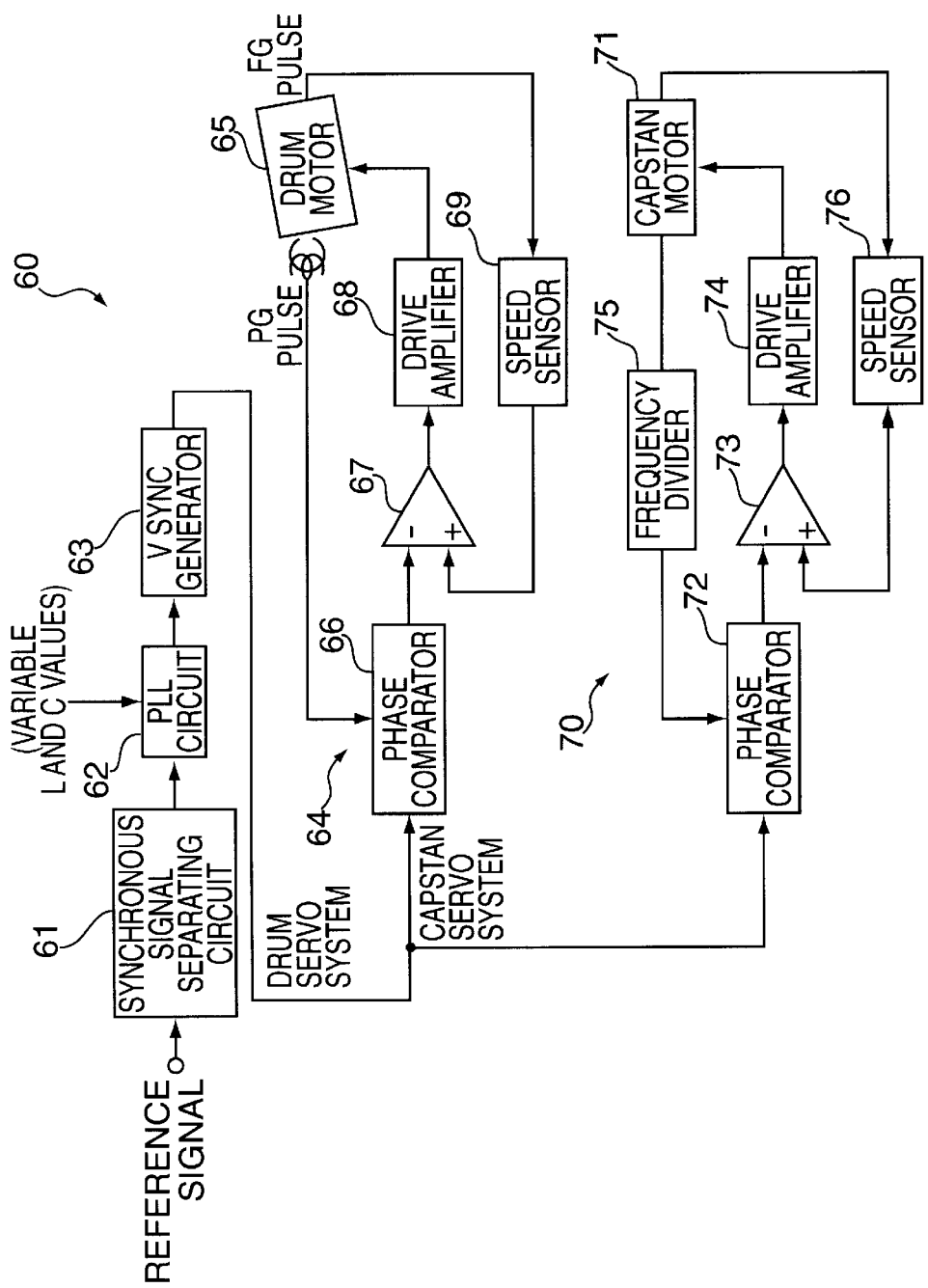
FIG. 13 is a block diagram showing the servo system of the modifying digital video tape player of FIG. 12.

The modifying digital video tape player 2 has a servo system arranged as shown in FIG. 13. As described above in the n=−4% case, the video signal of 625/50 recorded on the magnetic tape 40 of the video tape cassette is reproduced with a field frequency of 47.95 Hz.

A synchronous signal separating circuit 61 operates to extract a horizontal synchronous signal from the input reference signal and supply it to a phase lock loop (PLL) circuit 62. The PLL circuit 62 contains a voltage controlled oscillator (VCO). The clock output of the PLL circuit 62 is supplied to a vertical synchronous (VSYNC) generator 63. The vertical synchronous signal generated by the VSYNC generator 63 is supplied to a drum servo system 64 and a capstan servo system 65. It should be noted that the VSYNC generator 63 generates various clock signals required for the video and audio processing system as well, which are not illustrated or described herein.

In the drum servo system 64, a phase comparator 66 compares the phase drum rotation pulse (PG) from a drum motor 65 and the vertical synchronous signal and then supplies a phase control signal to the inverted input terminal of operational amplifier 67. The operational amplifier 67 also receives the speed control signal sensed by the speed sensor 69 from a frequency generation (FG) pulse sent from the drum motor 65. The output of the operational amplifier 67 is amplified by the drive amplifier 68 and then is supplied to the drum motor 65. The amplified signal is used for correcting slippage of the rotation number and the rotation phase of the drum motor 65.

In the capstan servo system 70, a phase comparator 72 compares the phases of a signal derived by frequency-dividing, via a frequency divider 75, the reproduction control signal, with the VSYNC signal and then supplies its phase control output signal to an inverted input terminal of an operational amplifier 73. The operational amplifier 73 also receives the speed control signal sensed by speed sensor 76, which is based on a frequency generation (FG) pulse sent from a capstan motor 71. The output of the operational amplifier 73 is amplified by a drive amplifier 74 and then is supplied to the capstan motor 71. The amplified signal is used for correcting slippage of the rotation number and the rotation phase of the capstan motor 71.

Figure 14:
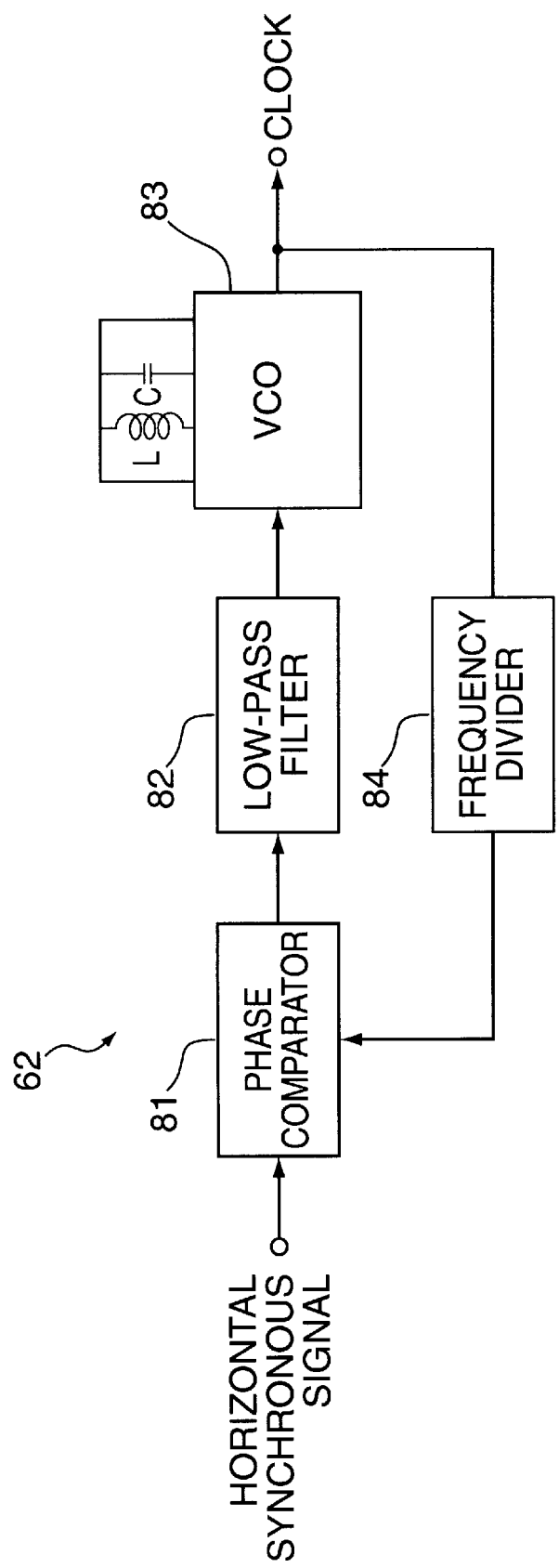
FIG. 14 is a block diagram of the PLL circuit of the servo system of FIG. 13.

The arrangement of the PLL circuit 62 is shown in FIG. 14. The PLL circuit 62 includes a phase comparator 81, a low-pass filter 82, a VCO 83 and a frequency divider 84. The phase comparator 81 operates to compare the phase of a horizontal synchronous signal separately extracted by the synchronous signal separating circuit 61 (FIG. 13) with a clock derived by dividing the output clock of the VCO at a predetermined ratio. The low-pass filter 82 passes the signal to the VCO 83. The VCO 83 changes its LC value according to the filtered output so that the generation clock may be switched between 47.95 Hz and 49.95 Hz, for example, in response to a reference signal to be supplied to the servo system. Hence, in response to an input of a reference signal, the modifying digital video tape player 2 is enabled to reproduce the video signal of 625/50 as the video signal of 625/47.95.

Figure 15:
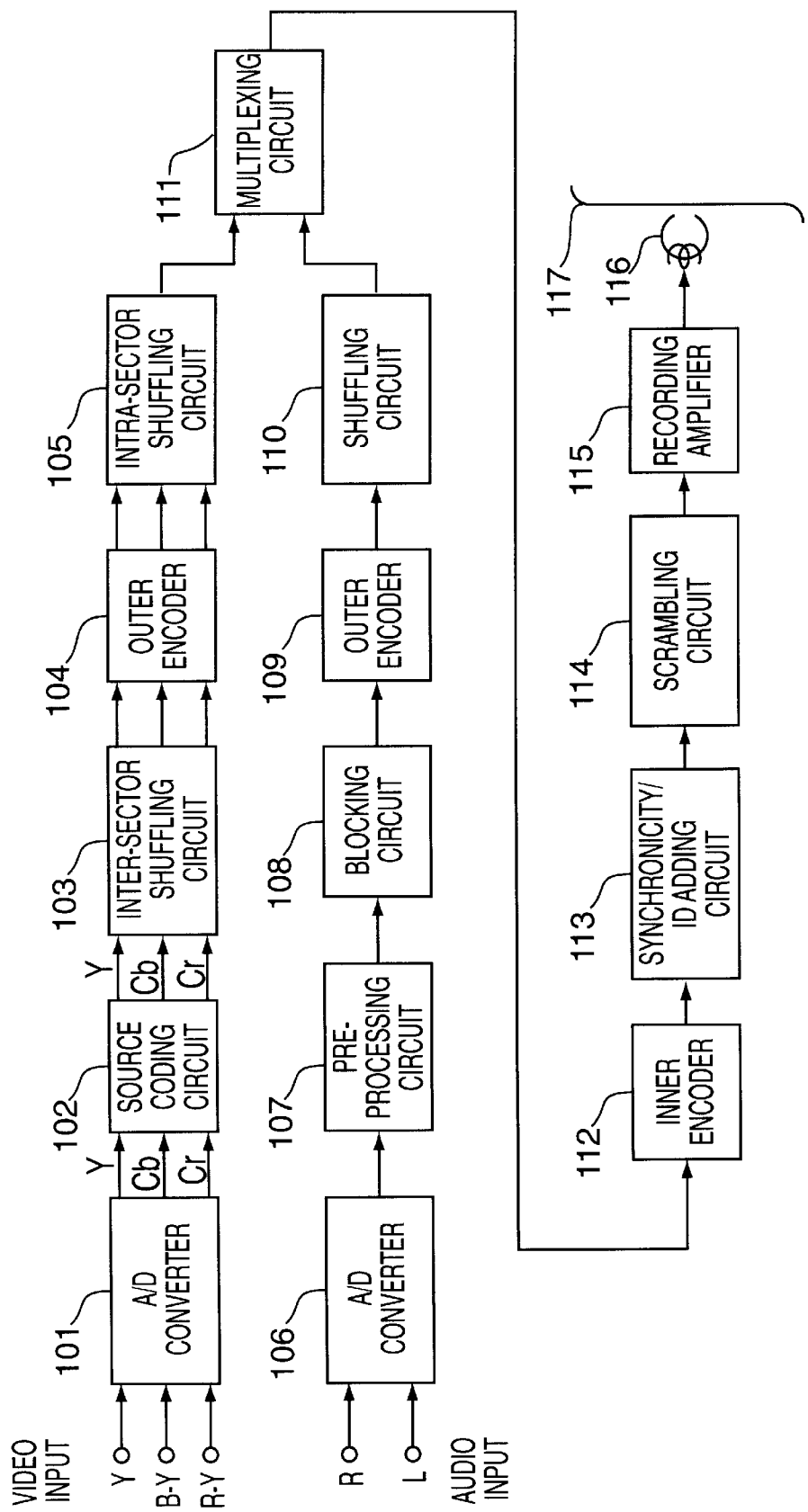
FIG. 15 is a block diagram showing a video and an audio processing system of the D-1 video recorder of FIG. 1.

In addition, the digital video tape recorder 4 may be a D-1 video tape recorder. The schematic arrangement of the video and audio processing system provided in the D-1 video tape recorder will be shown in FIG. 15.

The component video signals Y, B-Y and R-Y are converted into the corresponding digital video signals Y, Cb and Cr through the effect of an A/D converter 101. These digital video signals Y, Cb and Cr are supplied to a source coding circuit 102. The source coding circuit 102 operates to encode the digital video signals Y, Cb and CR with weight sequence codes. This encoding is the coding process for converting, e.g., 8-bit codes ranged in decimal sequence into the codes ranged in weight sequence. This process contributes to lessening the adverse effect of an error left on the screen that is not sensed by the error correcting codes. The digital video signals Y, Cb and Cr encoded by the source coding circuit 102 are supplied to an inter-sector shuffling circuit 103.

The inter-sector shuffling circuit 103 operates to shuffle the digital video signals Y, Cb and Cr over the sectors. The error correcting codes (ECC) added by outer encoder 104 at a later stage may be used for sensing an error, but not used for correcting the error if the error is greater than a given threshold. At this time, the system will attempt to conceal the error in the following manner. To overcome this shortcoming, the inter-sector shuffling circuit 103 operates to replace the occurrence sequence of the video codes with the sequence of the recording codes over the sectors. Then, the circuit 103 supplies its shuffled output to an outer encoder 104.

The outer encoder 104 operates to add the ECC to the shuffled output. Specifically, the outer encoder 104 operates to delimit the shuffled output into blocks each having a predetermined length; generate a 2-word Reed Solomon product code (checking code) for an outer code through a predetermined operation; and add the Reed Solomon product code to each block. Then, the outer encoder 104 supplies its output to an intra-sector shuffling circuit 105.

The intra-sector shuffling circuit 105 performs a shuffling process among the sectors of the encoded output. Specifically, the circuit 105 operates to rearrange the codes located two-dimensionally after generating an outer checking code as randomly as possible in the same two-dimensional block.

As for the audio path, the analog audio signal such as a R- or L-channel signal is converted into digital audio signals through the use of an A/D converter 106. The digital audio signal is supplied to a pre-processing circuit 107 for pre-processing. Then, the pre-processed signal is supplied to a blocking circuit 108.

The blocking circuit 108 operates to block the audio signal and then supply the blocked signal to an outer encoder 109. The outer encoder 109 operates to add the ECC to each audio signal block and then supply the resulting signal to a shuffling circuit 110. The shuffling circuit 110 operates to shuffle the encoded output. The shuffled video output from the intra-sector shuffling circuit 105 and the shuffled audio output from the shuffling circuit 100 are supplied to a multiplexing circuit 111. The multiplexing circuit 111 operates to time-divisionally multiplex the shuffled video output and the shuffled audio output. The multiplexed output is supplied to an inner encoder 112. The inner encoder 112 operates to add to the multiplexed output a common inner code that is a type of ECC. The encoded output is supplied to a synchronicity/ID adding circuit 113.

The audio signal or the video signal is composed of a common format called a synchronous block. The synchronicity/ID adding circuit 113 operates to add to two inner code blocks an ID pattern indicating a synchronous pattern, a block number and the like, and outputs the resulting signal as one sync block to a scrambling circuit 114. The output from the scrambling circuit 114 is supplied as recording current to a head 116 through recording amplifier 115 and a rotary transformer. With the head 116, the signal is digitally recorded on a magnetic tape in such an unsaturated manner as suiting to high-density recording.

The digital video tape recorder, such as a D-1 video tape recorder, has higher picture and audio quality for recording the signal and better dubbing characteristics than analog video tape recorders. The quality of the picture reproduced from the digitally recorded data mainly depends on coding parameters. Hence, the quality is hardly influenced by recording and reproducing. For example, distortion of the waveform of the reproduced picture is brought about only by the distortion introduced by an analog circuit before and after the A/D or the D/A conversion. The distortion and the noise appearing when recording or reproducing the data are errors of the reproduced codes are factors in degrading the quality of the picture. If the error rate is equal to or less than a certain value, use of the ECC makes it possible to correct or modify such degradation. As a result, it is expected that the digital recording may offer substantially better picture quality than an analog recording; especially when dubbing.

The adapter 3 of the system 1 for editing picture information has been described in a situation where LTC is used as a time code. Of course, VITC read by the VITC reader 7 (FIG. 2) may be used as the time code. In this case, the VITC operates to supply the field information such as an odd field and an even field to the CPU 10. The CPU 10 promptly establishes a target time code irrespective of the location of the source time code within the sequence because the CPU 10 obtains the time code and field information through the VITC on the picture of the target.

Figure 16:
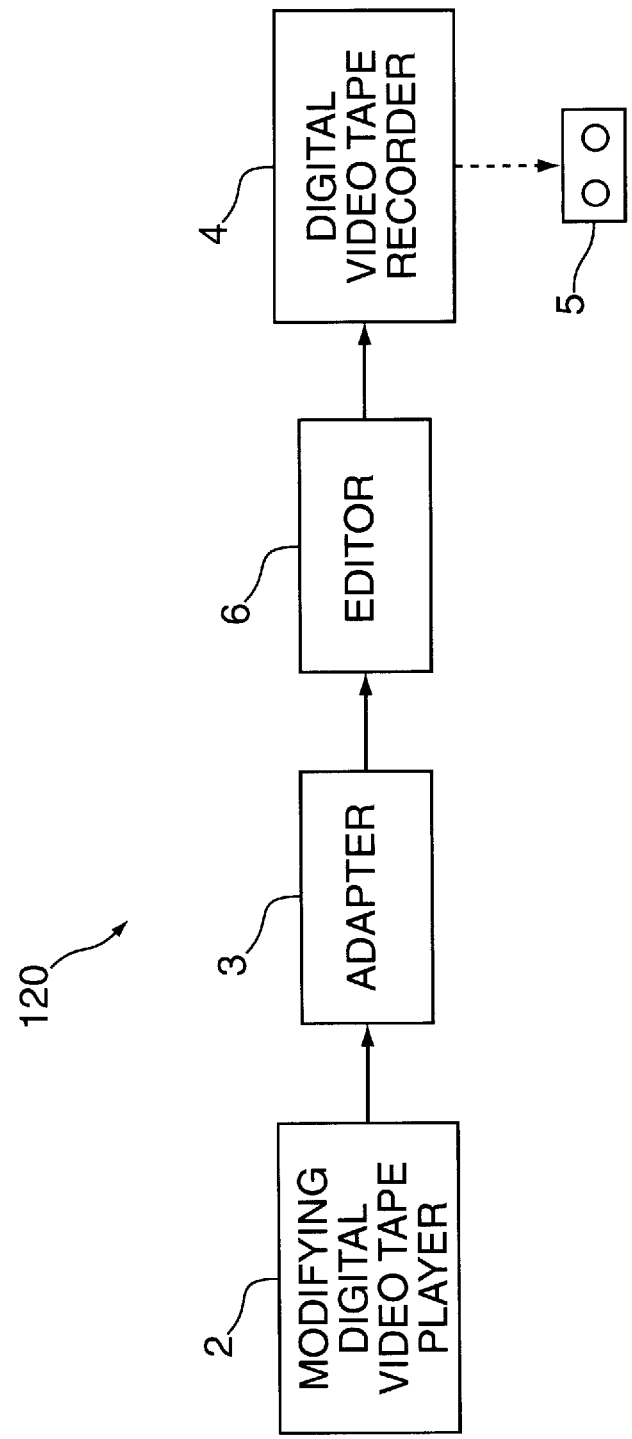
FIG. 16 is a block diagram showing an alternative arrangement of a system for editing picture information and for processing a time code according to the present invention.

According to another embodiment of the present invention, the picture information editing system 120 as shown in FIG. 16 can be considered. In the picture information editing system 120, an editor 6 uses the converted video signal with the converted time code generated by the adapter 3 without any transformation of the video signal. The edited result is recorded on a video tape cassette 5 by the digital video tape recorder 4. The arrangement of each component of FIG. 16 is the same as described in connection with FIG. 1 above.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for processing a time code such that time code data that accompanies picture information of a first system having a frame frequency a is mapped onto picture information of a second system having a frame frequency b when converting picture information of the first system into that of the second system, wherein the picture information of frame frequency a is obtained by changing the reproducing speed of the picture information by n % compared to its recording, a method for mapping the time code when converting picture information comprising the steps of:

converting time code data accompanying the picture information of said first system into a total frame number x;

calculating a total frame number y of the converted time code data from said total frame number x, the step of calculating the total frame number being executed to define a relationship between the total frame number x of the time code data added to each frame of the picture information of said frame frequency a and the total frame number y of the converted time code data added to each frame of the picture information of said frame frequency b as per the following expression:

$$y/b = x/(a/(1+n/100))$$

wherein;

$$0 \leq x \leq ((24*60*60*a)-1)*(1+n/100); \text{ and}$$

$$0 \leq y \leq ((24*60*60*b)-1); \text{ and}$$

generating the converted time code from the total frame number y.

2. A method for processing said time code as claimed in claim 1, wherein said time code is LTC (Longitudinal Time Code).

3. A method for processing said time code as claimed in claim 1, wherein said time code is VITC (Vertical Interval Time Code).

4. An apparatus for processing a time code such that time code data that accompanies picture information of a first system having a frame frequency a is mapped onto picture information of a second system having a frame frequency b when converting the picture information of said first system into the picture information of said second system, wherein the picture information of frame frequency a is obtained by changing by n % the reproducing speed of the picture information compared to its recording speed, comprising:

means for converting said time code data accompanying the picture information of said first system into a total frame number x;

means for calculating a total frame number y of converted time code data from said total frame number x; wherein said means for calculating the total frame number defines a relationship between said total frame number x of the time code data added to each frame of the picture information of the frame frequency a and said total frame number y of the converted time code data added to each frame of the picture information of said frame frequency b as follows:

$$y/b = x/(a/(1+n/100))$$

wherein;

$$0 \leq x \leq ((24*60*60*a)-1)*(1+n/100); \text{ and}$$

$$0 \leq y \leq ((24*60*60*b)-1); \text{ and}$$

means for generating the converted time code data from said total frame number y.

* * * * *